Inventor
R. Weber

Jan. 22, 1957 R. WEBER 2,778,422
CROSS CUTTING MACHINES OF THE ROTARY CUTTER DRUM TYPE
Filed Feb. 8, 1954 3 Sheets-Sheet 3

Inventor
R. Weber
By Attys.

United States Patent Office 2,778,422
Patented Jan. 22, 1957

2,778,422
CROSS CUTTING MACHINES OF THE ROTARY CUTTER DRUM TYPE

Rudi Weber, Heidenheim (Brenz), Germany, assignor to Jagenberg-Werke Akt.-Ges., Dusseldorf, Germany Application February 8, 1954, Serial No. 408,949

9 Claims. (Cl. 164—61)

The present invention broadly relates to the art of cutting and is particularly related to that phase of the cutting art known as cross cutting.

More particularly this invention relates to improvements in cross cutting machines of the rotary cutter drum type.

Still more particularly this invention relates to such machines embodying rotatable cutting knives that cut one or more traveling webs of paper, cardboard, or the like, and in which the rotary speed of the cutter knives is variable according to the desired length of sheet to be obtained while the knives receive the speed of the travelling web during the cutting period after appropriate acceleration or retardation has been effected during the idle or non-cutting period. In other words, the speed of the knives and the paper web are synchronized at the moment of cutting.

Cross cutting machines are known in the art in which the cutter knives operate with an irregular speed so that, for a variable rotary speed adjusted according to sheet length, the cutting speed of the cutter knives is constant. In general, in such arrangements the speed of the travelling paper web is constant and the rotary speed of the cutter knives during the cutting period is synchronized with the speed of travel of the web while by an acceleration or retardation of the rate of rotation of the cutter knives during the idle or non-cutting period and the consequent alteration of the cutter knife speed, the corresponding adjustment of the sheet length is obtained. This non-uniformity in the rotary movement of the cutter drums is obtained, in known cross cutting machines of this type, by the utilization of a suitable non-uniform gear or gearing. For example, this non-uniform gearing may constitute an elliptical gear drive or an adjustable crank drive. Such drives provide an adjustable variably accelerated gearing.

In cross cutting machines of this type where the knives are carried on drums, the dimensions of the drums must be so selected that flexure thereof by the cutting pressure is avoided and likewise, particularly where the width of the web being cut is substantial, the cutter drums must have substantial dimensions to prevent this flexure as a result of the large inherent weight of the drums. To avoid flexure of the drums, they are consequently provided with a large cross section and are of a correspondingly great or high weight. This weight must be accelerated and retarded during the course of one rotation of the drum. The torques resulting from the acceleration and retarding or deceleration of the drum stress the bearings of the machine as well as the gearing to a substantial extent, particularly where high operating speeds are employed so that the stressed parts are subjected to rapid wear or the output of the machine is reduced since the speed must be lowered to prevent wear. A lowered output speed does not suffice to meet the requirements of an economically operated cross cutting machine. Another disadvantage of this known arrangement using heavy cutter drums, lies in the fact that the forces produced by the acceleration and retardation of the drum are transmitted to the entire machine which is thus subjected to undesirable oscillation or vibration.

The present invention has for an object to provide a cross cutting machine with a rotary cutter drum arrangement that eliminates the aforementioned disadvantages.

The invention has for a particular object to provide a cutter drum constituted by a non-uniformly rotatable lightweight jacket on which the cutters are mounted and a solid core for the jacket which does not participate in the non-uniform movement of the jacket. This structure results in an arrangement in which only the comparatively lightweight jacket is subjected to acceleration and retardation while the solid core which provides the main weight mass remains unaffected by the non-uniform movement of the jacket and exerts solely a supporting function with the result that the lightweight jacket is supported by the core, particularly, in the instance of cutting.

In connection with accomplishing the foregoing object, the solid core can be uniformly driven at the speed of the continuous and also uniformly fed paper web or the core can be supported within the jacket either stationarily or freely rotatably therein.

The aforestated broad object of the invention results in considerable reduction of the non-uniformly rotated masses and a consequent considerable reduction of the disadvantageous effects on the drive. However, the invention has a further object to provide an arrangement in which a balance mass is provided for the non-uniformly rotating jacket. Specifically the balance mass is driven so as to obtain substantially complete elimination of the mass forces whereby upon acceleration of the jacket the balance mass is retarded and conversely on retardation of the jacket a corresponding acceleration is imparted to the balance mass.

In accomplishing this object and as a still more specific object, this invention provides an adjustable non-uniform drive for the stable core that is mounted within the lightweight jacket.

Further and more specific objects will be apparent from the following description taken in connection with the accompanying drawings, in which.

Figure 1:
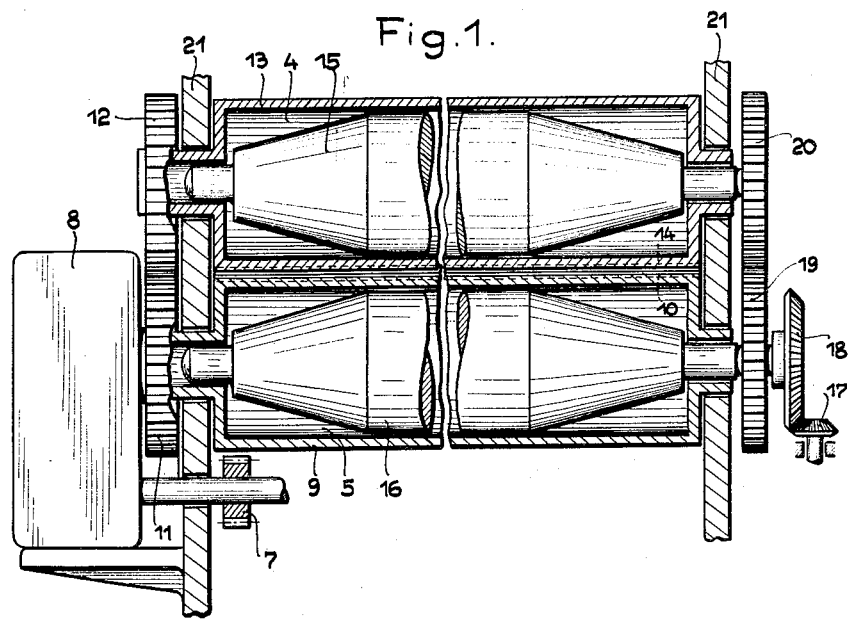
Figure 1 illustrates diagrammatically and partly in longitudinal section, a cutter drum arrangement in which the core receives a uniform rotary movement.
Figure 3:
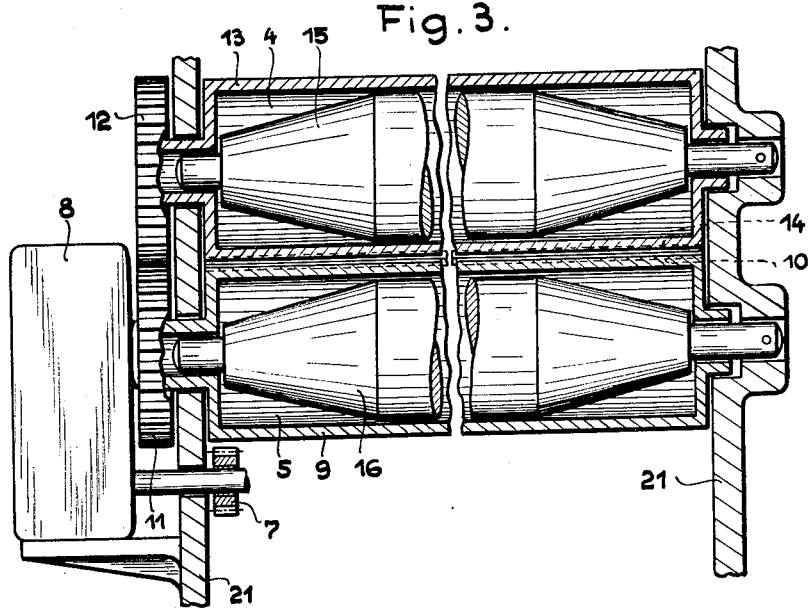
Figure 4:
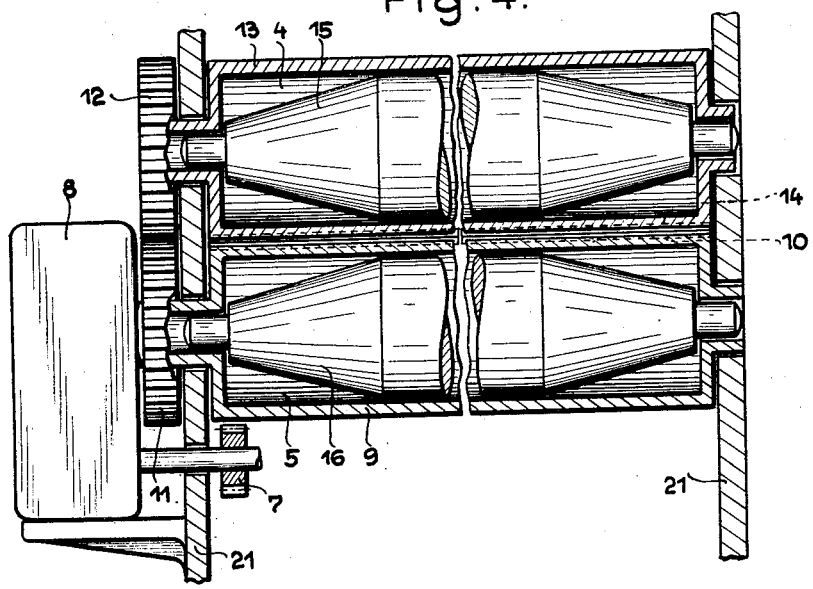
Figure 5:
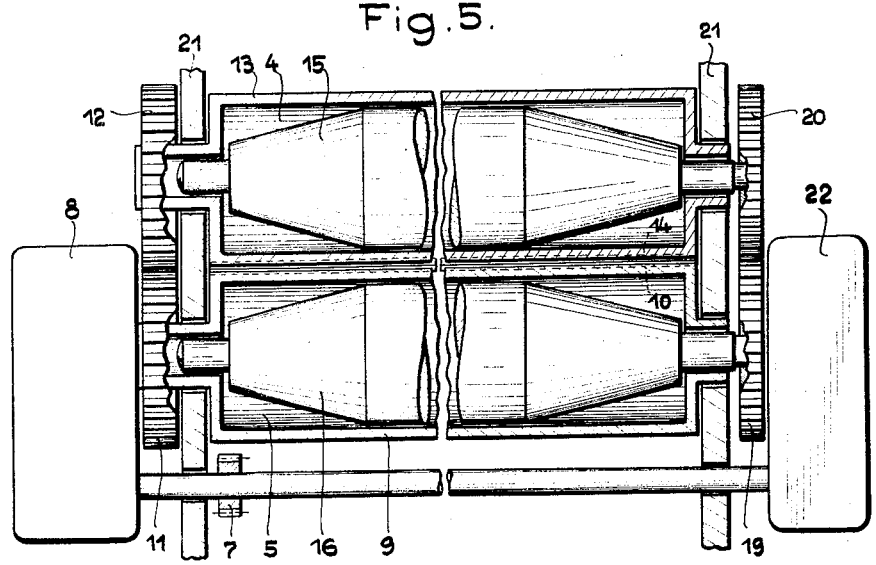
Figure 6:
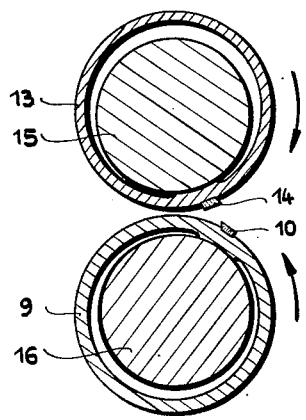

Figure 3 is a fragmentary diagrammatical view partly in longitudinal section through a cutter drum assembly in which the core is stationarily supported, Figure 4 is a similar view through a cutter drum assembly in which the core is freely rotatable within the jacket, Figure 5 is a view similar to Figure 1, but illustrating an arrangement in which the core is driven by a second non-uniform drive so that the core is accelerated when the jacket is retarded and vice versa, Figure 6 is a cross sectional view through a modification of a cutter drum assembly in which the jacket is mounted eccentrically relative to the core.

Figure 2:
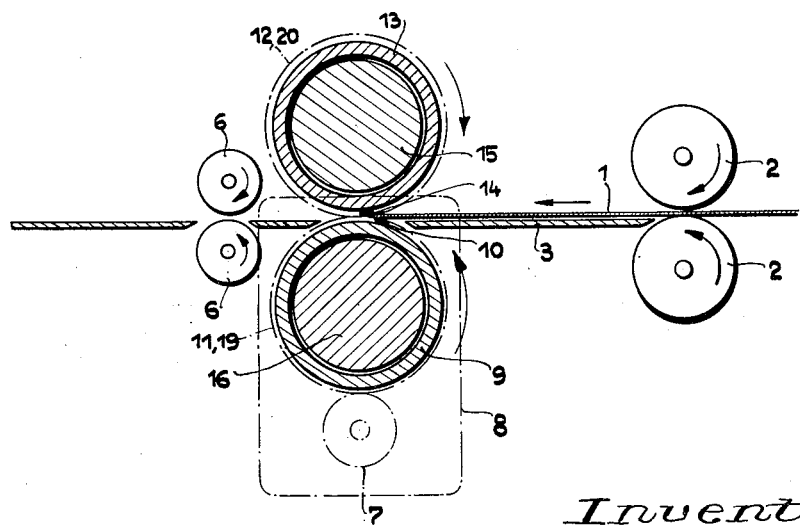
Figure 2 is a side view of the arrangement of Figure 1.

With reference to the drawings and particularly as illustrated in Figure 2, the cross cutting machine is of the type in which the web 1 of the material that is to be cut is drawn through by a first pair of feeder rollers 2 at a uniform speed, moved over guide means 3 and fed between the drums 4 and 5 respectively carrying cutter blades 14 and 10 which cooperate to cut the web into individual sheets. The cut sheets are then engaged between the feed rolls 6 and fed to a stacking arrangement, not shown, or to other devices for further treatment. The source of supply of the web 1 is not illustrated.

In the constructional form of the invention embodied in Figures 1 and 2, the drive for the cutter drums 4 and 5 is received from the cross shaft having a gear wheel 7 thereon which is driven by suitable driving mechanism, not shown. The shaft drives a non-uniform drive arrangement illustrated diagrammatically at 8. The output shaft of the non-uniform drive is connected to the jacket 9 of the lower cutter drum 5. The non-uniform rotary movement imparted to the jacket or shell 9, carrying the cutter blade 10, is transmitted through gear wheels 11 and 12 to the jacket or shell 13 of the upper cutter drum 4 carrying a cutter blade 14 that cooperates with the cutter 10. In this embodiment of the invention, the solid cores 16 and 15 respectively supported in jackets 9 and 13 are driven by a suitable drive device, not shown, transmitting drive from the initial feed rollers 2 through beveled gears 17 and 18, bevel gear 18 driving core 16 and gear 19 which meshes with the gear 20 to rotate core 15. The drive rotates the cores at a speed which essentially corresponds to the speed of movement of the continuous and uniformly fed web 1. With this arrangement during the cutting, there is a similar movement imparted to jackets 9 and 13 and to the cores 16 and 15 relative to the travelling web 1 whereby the particular jacket concerned is supported during exertion of the cutting pressure by the respective core without any friction occurring between jackets and cores. This is due to the fact that the drive for the jackets essentially synchronizes the jackets and thus the cutter with the web at the moment of cutting and the cores are synchronized with the web.

If it is desired to increase the intermediate space between the peripheral surface of the cores 15 and 16 and the inner surface of the respective jackets 13 and 9, the jackets can be eccentrically mounted relative to the cores as diagrammatically illustrated in Figure 6. With such mounting the contact between core and jackets occurs solely at the moment of cutting with resulting advantage that there is no sliding friction between the peripheral surface of the core and the inner side of the jacket so that it would not be necessary to utilize any bearing means such as ball bearings.

In the modified form of Figure 3, the essential features of driving the jackets through non-uniform gearing and in which the jackets are of lightweight construction and surround a supporting core, are retained. However, the cores 15 and 16 are stationarily supported by being connected to the machine frame part 21.

In Figure 4, the arrangement is such that the cores 15 and 16 are freely rotatable within the jackets 13 and 9 respectively. In both arrangements, the stable core provides the necessary support of the lightweight jacket at the instant the cutting pressure is produced so that these latter two arrangements provide a simplified form of construction which eliminates a drive for the core.

Figure 5 relates to a modification which provides for the balancing of the acceleration and retardation forces that result even though a comparatively lightweight jacket construction is employed. To provide for this balancing effect, the core 16 or 15 enclosed by the jackets 9 or 13 is used as a balancing mass and is retarded allowing for the different inertia movements to the extent that the jacket concerned is accelerated and reversely. To obtain this non-uniform movement of the core that is opposed to the non-uniform rotary movement of the jacket, a second non-uniform drive arrangement shown diagrammatically at 22, is used. This second non-uniform drive drives cores 15 and 16 through the gear wheels 19 and 20 at the requisite non-uniform speed.

It is therefore clear that this invention as opposed to known constructions in which a balanced mass is supported separately from the cutter drums, derives the advantage that apart from space saving arrangement and considerable reduction of weight, the danger of transmitting oscillation or vibration to the entire machine is substantially eliminated due to the fact that the acceleration and retardation forces within the cutter drums are balanced as a result of the concentric arrangement of the masses to be balanced and the balancing masses lying one over or within the other.

What I claim is:

1. A cutter drum arrangement for rotary cross cutters for cutting travelling webs and which cross cutters are of the type in which the peripheral speed of the cutters at the moment of cutting is adjustable to the speed of the travelling web, said cutter drum arrangement including a non-uniformly rotatable jacket of lightweight construction and thin-walled cross-section, cutting means carried thereby and a stable core of substantially greater weight than the weight of the jacket, housed within the jacket and adapted to make supporting contact with the interior of the jacket at least opposite the cutting means and at least at the moment of cutting and said core being free of the non-uniform movement of the jacket.

2. A cutter drum assembly as defined in and by claim 1, in which the jacket is mounted eccentrically relative to the core and said jacket having an interior projection extending circumferentially thereof opposite the cutting means and adapted to engage the periphery of the core during cutting.

3. A cutter drum arrangement for rotary cross cutters for cutting travelling webs and which cross cutters are of the type in which the peripheral speed of the cutters at the moment of cutting is adjustable to the speed of the travelling web, said cutter drum arrangement including a non-uniformly rotatable jacket of lightweight construction and thin-walled cross-section, cutting means carried thereby, a stable core of substantially greater weight than the weight of the jacket, housed within the jacket and free of the non-uniform movement thereof, said core constituting a balance mass for the jacket and means for driving the core so that it is retarded upon acceleration of the jacket and accelerated upon retardation of the jacket.

4. In a cross cutting machine, superposed cutting means each including a lightweight rotary shell of thin-walled cross-section and a cutter thereon operative to cut a travelling web passing between the shells, means for driving the shells and thus the cutting means at a non-uniform speed imparting acceleration and retardation to the shells during revolution thereof to synchronize the movement of the cutters, a solid core means within each shell having peripheral surfaces adapted to make supporting contact with the interior of the shells at least opposite the cutters and at least at the moment of cutting so as to support the shells during cutting and said core means being free of the non-uniform movements of the shells and each core means having substantially greater mass than the respective shells and respectively constituting the main mass of each cutting means.

5. In a cross cutting machine as claimed in claim 4 and said cores being stationarily supported within the shells.

6. In a cross cutting machine as claimed in claim 4 and said shells being eccentrically mounted relative to said cores.

7. In a cross cutting machine as claimed in claim 4, said cores being rotatably supported within the shells.

8. In a cross cutting machine superposed cutting means each including a lightweight rotary shell of thin-walled cross-section and a cutter thereon operative to cut a travelling web passing between the shells, means for driving the shells and thus the cutting means at a non-uniform speed imparting acceleration and retardation to the shells during revolution thereof to synchronize the movement of the cutters and a solid core means within each shell for supporting the same during cutting, said core means being free of the non-uniform movements of the shells and each core means having substantially greater mass than the respective shells and respectively constituting the main mass of each cutting means and said cores constituting balance masses for the shells and means for driving the cores at a non-uniform speed reverse and opposite to the movement of the shells so that each core is retarded upon acceleration of its associated shell and accelerated upon retardation of its associated shell.

9. In a cross cutting machine, superposed cutting means each including a lightweight rotary shell of thin-walled cross-section and a cutter thereon operative to cut a travelling web passing between the shells, means for driving the shells and thus the cutting means at a non-uniform speed imparting acceleration and retardation to the shells during revolution thereof to synchronize the movement of the cutters and a solid core means within each shell for supporting the same during cutting, said core means being free of the non-uniform movements of the shells and each core means having substantially greater mass than the respective shells and respectively constituting the main mass of each cutting means, said cores each constituting a balance mass for the respective shells and means for driving the cores so that they are retarded upon acceleration of the shells and accelerated upon retardation of the shells.

References Cited in the file of this patent

UNITED STATES PATENTS

| | | |
|---|---|---|
| 542,497 | Rehfuss | July 9, 1895 |
| 677,243 | Luther | June 25, 1901 |
| 712,273 | Eberhardt | Oct. 28, 1902 |
| 1,489,890 | Langston | Apr. 8, 1924 |
| 2,394,589 | Behrens | Feb. 12, 1946 |
| 2,401,639 | Hawthorne | June 4, 1946 |
| 2,601,550 | Nau-Touron | June 24, 1952 |
| 2,603,153 | Warren et al. | July 15, 1952 |
| 2,676,387 | McArn | Apr. 27, 1954 |